June 26, 1923.
H. D. COOK
AUTO ATTACHMENT
Filed July 27, 1922
1,460,193
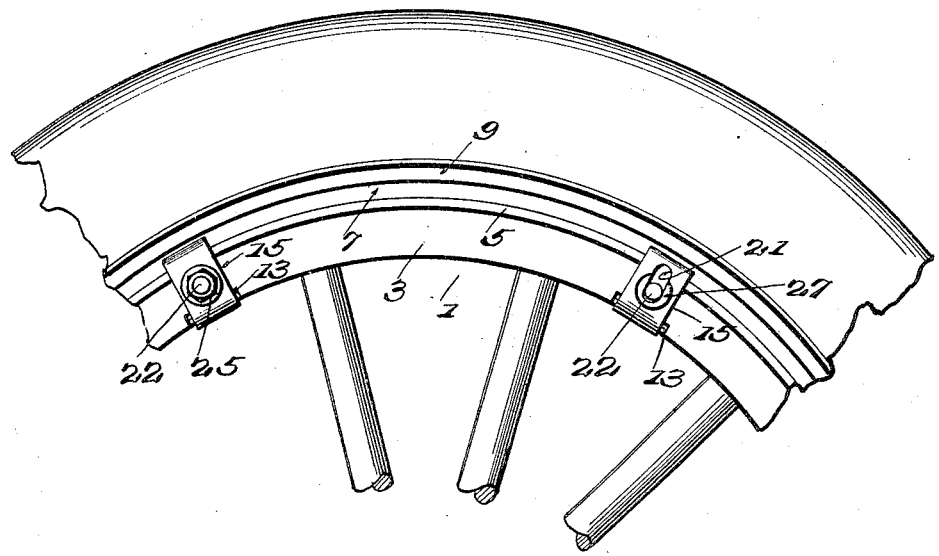
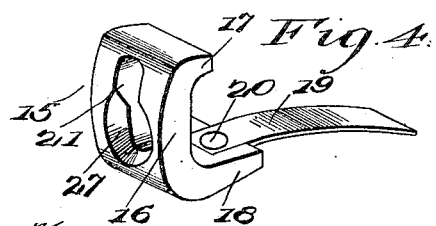
WITNESSES
R. A. Thomas
INVENTOR
H. D. Cook
BY
ATTORNEYS Patented June 26, 1923.

1,460,193

UNITED STATES PATENT OFFICE.

HERBERT DIVINE COOK, OF TERRE HAUTE, INDIANA.

AUTO ATTACHMENT.

Application filed July 27, 1922. Serial No. 577,787.

*To all whom it may concern:*

Be it known that I, HERBERT D. COOK, a citizen of the United States, and resident of Terre Haute, in the county of Vigo and State of Indiana, have invented certain new and useful Improvements in Auto Attachments, of which the following is a specification.

My invention relates to devices for releasably holding demountable rims upon felloes of vehicle wheels and consists in the combinations, constructions and arrangements herein described and claimed.

An object of my invention is to provide a simple and effective attachment for felloes of vehicle wheels of ordinary construction which are adapted to act in conjunction with the felloes of the wheels to permit of a demountable rim being locked in position on the felloe or released as quickly for dismounting therefrom.

A further object of the invention is to provide an attachment of the character described which is adapted to cooperate with the felloe of a wheel to lock a demountable rim upon the felloe of the wheel or to release the demountable rim for dismounting from the wheel with the necessity of detaching any element of the rim locking means from the felloe obviated, thus precluding the accidental loss of parts or elements of the device in service.

A still further object of the invention is to provide a device of the character described which is adapted to be operatively applied to a felloe of a vehicle wheel of ordinary construction without any change being required in the construction of the wheel.

A still further object of the invention is to provide an attachment of the character described which is not likely to get out of order easily and which is thoroughly practical commercially.

Other objects and advantages will be apparent from the following description, and the novel features of the invention will be particularly outlined in the appended claims.

My invention is illustrated in the accompanying drawings, forming a part of this application, in which—

Figure 1 is a side elevation of a fragmentary portion of a vehicle wheel equipped with my invention, Figure 2 is a transverse section through the felloe portion of the wheel illustrated in Figure 1 and through a demountable rim held in applied position, Figure 3 is a view similar to Figure 2, showing the demountable rim released and separated from the felloe of the wheel, and Figure 4 is a perspective view of the rim clamp comprised in the attachment and being shown in detached position.

Referring now to the drawings and particularly to Figure 1 thereof, I show a fragmentary portion of a vehicle wheel 1 of a well known type of construction. The vehicle wheel 1 includes a felloe portion consisting of a web 2 having spaced integral rim flanges 3 and 4 respectively. The rim flanges 3 and 4 are formed with oppositely turned inclined edge portions 5 and 6 respectively which are adapted to be engaged by the inclined edges or faces of annular flanges 7 and 8 respectively which extend from the inner periphery of the web portion 9 of a demountable rim 10 for the wheel 1. As will be understood, the rim 10 will be held locked to the rim flanges of the felloe of the wheel when in the position in which illustrated in Figure 2. When in the position in which illustrated in Figure 2, the supporting flanges 7 and 8 of the demountable rim rest upon the inclined edge portions of the flanges of the felloe and are held because of their engagement with the latter against movement laterally of the felloe toward the right hand side of the sheet of drawing. However, the engagement of the supporting flanges of the demountable rim with the rim flanges of the felloe is not such as to preclude displacement of the rim when it is moved laterally of the felloe toward the left hand side of the sheet of drawings and means must therefore be provided to act in conjunction with the felloe to hold the demountable rim in the position in which illustrated in Figure 2.

The parts described so far are ordinary in construction and form no part of my invention except in so far as they cooperate with the parts which will be hereinafter described.

A felloe comprised in a wheel of the type of construction illustrated and described is ordinarily provided with aligned bolt receiving openings 11 and 12 formed respectively in the flanges 3 and 4 of the felloe. It is to be understood that a plurality of pairs of these bolt receiving openings 11 and 12 are ordinarily provided and associated with each of the openings 11 in spaced relation thereto is a slot 13 which is formed through the felloe at the juncture of the web 2 and the flange 3 thereof. A shoulder 14 is thus defined by the bottom or inner wall of the slot 13 and provides a stop against which one end of a clamp or clip member having a portion adapted to engage with one flange of the demountable rim to hold the latter on the felloe may be pressed by means carried by a bolt extending through the bolt receiving openings 11 and 12.

My invention provides a clamp or clip 15 which is substantially U-shaped, comprising a web portion 16 having an integral lug or lip portion 17 extending laterally thereof at its one edge and having a flange portion 18 extending laterally thereof in parallel relation to the lug or lip 17. The flange 18 is considerably longer than the lug or lip portion 17 and is adapted to be projected through one of the slots 13 into abutting relation to one of the shoulders 14. A flat spring member 19 is attached at its one end to the inner face of the flange 18 midway between its side edges, as at 20 and is curved so that its outer end extends through the plane of the outer face of the flange 18 whereby the spring 19 will be under tension continuously when in applied position in respect to the felloe of the wheel 1, as will be understood from the following. The web portion 16 of the clamp or clip 15 is provided with an elongated opening or slot 21 therethrough, which slot terminates at its opposite ends adjacent to but short of the junctures of the web portion 16 with the lug or lip 17 and the flange 18. The bolt 22 is adapted to be projected through aligned openings 12 and 11 and through the elongated opening or slot 21 in the web portion of one of the clamps or clips. The bolt 22 is disposed so that the head 23 thereof abuts the flange 4 of the felloe and prevents a further axial movement of the bolt in the direction of the flange 3. Each of the openings 12 in the flange 4 is preferably non-circular in contour and the bolt 22 has a head portion 24 adapted to engage the tubular opening so that the bolt will be held against rotation when in the position in which illustrated in Figures 2 and 3. A nut 25 in threaded engagement with the bolt 22 is fashioned with a beveled end 26 adapted to a counter-bore 27 in the end portion of the elongated opening 21 that is proximate to the flange 18.

From the foregoing description of the various parts of the device the operation thereof may be readily understood. When it is desired to lock the rim upon the felloe of the wheel 1, the rim is moved from the position in which illustrated in Figure 3 to the position in which illustrated in Figure 2. At this time, the action of the spring 19 which is under tension and presses at its extremity against the inner peripheral wall of the felloe of the wheel will yieldingly hold the clamp or clip 15 in the position in which illustrated in Figure 3. The bolt 22 is in contact with the slot or elongated opening 21 at the end thereof proximate to the lug or lip 17. The nut 25 is then tightened on the bolt 22, thus forcing the clamp outwardly about the shoulder 14 as a fulcrum and against the action of the spring 19 until the lug or lip portion 17 bears against the outer side of the flange 7. It is intended that the threads on the bolt are such that only a relatively few turns of the nut 25 will be required to move the clip 15 from inactive position as illustrated in Figure 3 to active or holding position as illustrated in Figure 2. Of course, only the same number of turns of the nut on the bolt will be required to permit movement of the clamp 15 under actuation by the spring 19 from the position illustrated in Figure 2 to the position illustrated in Figure 3, in which last position the clamp 15 is disengaged from the flange 7 of the demountable rim and the latter can be slipped from the felloe of the wheel at will. When the clamp 15 is in active or holding position, the nut 25 engages the counter-bore 21, thus precluding any possibility of the clamp moving from an active position until the nut is turned a plurality of revolutions on the bolt.

The outer face of the web portion of the clamp or clip is curved or otherwise fashioned so as to preclude binding of the clamp and nut 25 when the clamp is being constrained by the camming action thereon of the nut 26 to move from inactive position, as illustrated in Figure 3 to active position, as illustrated in Figure 2.

It will thus be apparent that when an attachment embodying my invention is used to releasably hold a portion of the demountable tire rim 10 in applied position on the felloe of the wheel 1, neither the nut 25 nor the clamp need be removed from the bolt 22 to permit dismounting of the tire rim. A plurality of the attachments are used to hold the tire rim in place on the wheel and since neither the nut nor the clamp need be removed from the bolt when removing a tire rim from the wheel, the possibility that one of such nuts or clamps may be lost during the removal or replacement of the rim is reduced to a minimum.

Obviously, my invention is susceptible of embodiment in forms other than that illustrated in the accompanying drawings, and I therefore consider as my own all modifications and adaptations of the form of the device herein disclosed which fairly fall within the scope of the appended claims.

I claim:—

1. The combination with a felloe having a pair of peripheral flanges adapted to support a demountable tire rim, said flanges having aligned bolt receiving openings therethrough and a slot through the felloe at the juncture of the flange and the periphery of the felloe, of a clamp comprising a substantially U-shaped clamping member having a flange at one end adapted to the slot and to abut the inner wall of the slot and having a lip at the outer end of the clamping member, said clamping member having an elongated slot formed therethrough, a bolt extending through the aligned openings of the flange of the felloe and through the elongated opening of the clamping member, and a nut in threaded engagement with the bolt and adapted to contact the clamping member to hold the latter in clamping relation to both the felloe and a portion of the tire rim and to permit movement of the clamping member transversely of the bolt and out of engagement with the tire rim, as desired.

2. The combination with a felloe having a pair of peripheral flanges adapted to support a demountable tire rim, said flanges having aligned bolt receiving openings therethrough and a slot through the felloe at the juncture of the flange and the periphery of the felloe, of a clamp comprising a substantially U-shaped clamping member having a flange at one end adapted to the slot and to abut the inner wall of the slot and having a lip at the outer end of the clamping member, said clamping member having an elongated slot formed therethrough, a bolt extending through the aligned openings of the flange of the felloe and through the elongated opening of the clamping member, a nut in threaded engagement with the bolt and adapted to contact the clamping member to hold the latter in clamping relation to both the felloe and a portion of the tire rim and to permit movement of the clamping member transversely of the bolt and out of engagement with the tire rim, said clamping member having an elongated opening therethrough counter-bored at the end thereof proximate to the flange, whereby said nut engages the counter-bored portion of the elongated opening when screwed tight against the clamping member to releasably hold the latter in engagement with the tire rim.

3. The combination with a felloe having a pair of peripheral flanges adapted to support a demountable tire rim, said flanges having aligned bolt receiving openings therethrough and a slot through the felloe at the juncture of the flange and the periphery of the felloe, of a clamp comprising a substantially U-shaped clamping member having a flange at one end adapted to the slot and to abut the inner wall of the slot and having a lip at the outer end of the clamping member, said clamping member having an elongated slot formed therethrough, a bolt extending through the aligned openings of the flange of the felloe and through the elongated opening of the clamping member, a nut in threaded engagement with the bolt and adapted to contact the clamping member to hold the latter in clamping relation to both the felloe and a portion of the tire rim and to permit movement of the clamping member transversely of the bolt and out of engagement with the tire rim, and a spring member attached at one end to the flange of said clamping member and reacting at its other end against the peripheral wall of the felloe, whereby said spring tends to urge said clamping member out of engagement with the tire rim.

4. A securing device for demountable rims comprising a substantially U-shaped clamping member having an elongated opening extending transversely through the web portion thereof, means extending through said elongated opening for supporting the clamping member on a felloe with one flange thereof in abutting relation to the felloe and with the edge of the other flange thereof lying in an arc of a circle intersecting the proximate flange of a rim disposed on the felloe, and means adjustable on said supporting means for swinging the clamping member about the felloe as a fulcrum into clamping relation to the said flange of the rim, and a flat spring member secured at its one end to said clamping member and reacting at its other end against said felloe to urge the clamping member out of clamping relation to said rim.

5. A securing device for demountable rims comprising a substantially U-shaped clamping member having an elongated opening extending transversely through the web portion thereof, said elongated opening being counterbored adjacent to one of its ends, a bolt adapted to be carried by a felloe and to extend laterally of the latter through the elongated opening of the clamping member, whereby the latter will be supported with one of its flanges in abutting relation to the felloe and with the edge of its other flange lying in an arc of a circle intersecting a rim disposed on the felloe, and a nut threadedly engaging the projecting portion of the bolt for swinging the clamping member on its first named flange with the felloe as a fulcrum until the second named flange of the clamping member is in clamping relation to the rim, said nut being adapted to then engage with the counterbored portion of the elongated opening to lock the clamping member against turning laterally of the bolt.

HERBERT DIVINE COOK.